Patented May 23, 1944

2,349,729

UNITED STATES PATENT OFFICE 2,349,729

THERAPEUTIC ARSENIC PREPARATION

Russell Hopkinson, East Hampton, and Alexander V. Tolstoouhov, New York, N. Y., assignors, by mesne assignments, to Parke, Davis & Company, Detroit, Mich., a corporation of Michigan No Drawing. Application August 24, 1940, Serial No. 354,120

5 Claims. (Cl. 167—69)

The present invention relates to pharmaceutical products composed of or containing organic compounds of trivalent arsenic and having spirocheticidal and trypanosomicidal properties.

This application is a continuation-in-part of our application, Serial No. 259,886, filed March 4, 1939.

More specifically, our invention relates to the manufacture of improved pharmaceutical preparations by the use of the hydrochlorides of amino-aryl-dichloro-arsines and of amino-aryl-arsine oxides, preferably in the dry, solid form, which preparations are of improved stability and are capable of yielding aqueous solutions of novel composition and improved properties. The invention is, however, not limited to dry preparations but includes also aqueous solutions within certain pH ranges, as will be described more fully below.

Briefly described, our invention involves the stabilization of arsenical compounds by compounding or associating therewith, preferably in the dry condition, buffer compounds such that aqueous solutions will be obtained therewith which are within predetermined pH ranges, the solid preparations and the solutions having numerous advantages both from the clinical and manufacturing standpoints over prior arsenical preparations which yield strongly acid solutions, as will be set out in detail hereinafter.

In the present state of the art it is known that trivalent arsenical compounds may be associated with a neutralizing agent, such as sodium carbonate, in a dry powdered mixture which, when dissolved in water, forms a therapeutically useful solution suitable for intravenous injection. United States Patent No. 2,092,028, issued September 7, 1937, describes a mixture of 3-amino-4-hydroxy phenyl arsine oxide hydrochloride with sodium carbonate. United States Patent No. 2,222,384, issued November 19, 1940, describes a mixture of 3-amino-4-hydroxy phenyl dichloro-arsine hydrochloride with sodium carbonate.

The principal object of the present invention is to provide a dry mixture of solid arsenical with a buffering agent thereby obtaining a preparation of improved stability and one which, when dissolved in water, forms a therapeutically useful solution having improved properties.

We have discovered that improved preparations result when the trivalent arsenical, such as 3-amino-4-hydroxy phenyl arsine oxide hydrochloride and 3-amino-4-hydroxy phenyl dichloroarsine hydrochloride, is associated with a buffer agent such as sodium citrate, sodium succinate or sodium malonate. In the broader aspects of the invention the buffer agents which may be used include—

1. The alkali metal salts of the polybasic acids, preferably citric, succinic, malonic, tartaric, and phthalic acids, and
2. Mixtures of one or more of said salts with sodium carbonate or di- or tri-sodium phosphate.

Among the advantages of our new preparations are improved stability, both in the dry mixture and in the water solution of the mixture, decreased pain on injection, and simplicity in manufacture. The buffer agents, above enumerated, when used in two to five times the weight of the arsenical produce in aqueous solution a pH of from 4.5 to not over 6.5 whether the solution be saturated or dilute as 1 in 10,000. Preferably, the buffer agent is present in a greater than equivalent proportion to that of the arsenical.

A particular advantage in the use of the citrate, succinate or malonate is that a 1.5% solution is isotonic with body fluids, and this is a very satisfactory strength for producing the correct pH and adequate buffer effect in connection with an average dose of either of the above named arsenicals.

A further advantage of the above mentioned buffer agents is that the desired pH of the solution may be obtained without exact measurement of the added substances.

The following examples further illustrate the invention:

Example 1

.040 gm. of dry 3-amino-4-hydroxy phenyl dichloroarsine hydrochloride are mixed with .15 gm. of dry anhydrous sodium succinate or malonate and ampuled, or packaged in any other suitable more or less moisture-proof container. On dissolving the mixture in 10 cc. of water, the solution will be isotonic and have a pH of 5.4.

Example 2

.045 gm. of dry 3-amino-4-hydroxy phenyl dichloroarsine hydrochloride are mixed with .150 gm. of dry, anhydrous sodium citrate and packaged. On solution in 10 cc. of water, the mixture will be isotonic and have a pH of 5.3.

Example 3

.045 gm. of dry 3-amino-4-hydroxy phenyl dichloroarsince hydrochloride, .140 gm. of dry, anhydrous disodium phosphate and .0244 gm. of dry, anhydrous citric acid are mixed and packaged. On mixing with 10 cc. of water, the resulting solution will have a pH of 6.4.

Example 4

.040 gm. of dry 3-amino-4-hydroxy phenyl arsine oxide hydrochloride are mixed and packaged with 0.100 gm. of dry, anhydrous sodium citrate. When the mixture is dissolved in 10 cc. of water, the resulting solution will have a pH of 5.6. The arsenical appears to be present in the solution almost completely in the form of the undissociated citrate.

The preferred preparation of our invention is that given in Example 2 above where the arsenical is 3-amino-4-hydroxy phenyl dichloroarsine hydrochloride and the buffer agent is sodium citrate.

We claim:

1. A spirocheticidal preparation comprising an arsenical of the class consisting of 3-amino-4-hydroxy phenyl arsine oxide hydrohalide and 3-amino-4-hydroxy phenyl dihalo arsine hydrohalide associated with one of the class consisting of an alkali metal salt of citric, succinic, malonic, tartaric and phthalic acids, said preparation when in aqueous solution having a pH value between 4.5 and 6.5.

2. A spirocheticidal preparation comprising an arsenical of the class consisting of 3-amino-4-hydroxy phenyl arsine oxide hydrohalide and 3-amino-4-hydroxy phenyl dihalo arsine hydrohalide associated with sodium citrate in amount sufficient to maintain an injectable solution of a mixture of said substances at a pH value between 4.5 and 6.5.

3. A spirocheticidal preparation comprising 3-amino-4-hydroxy phenyl dichloroarsine hydrochloride associated with sodium citrate in amount sufficient to maintain an injectable solution of a mixture of said substances at a pH value between 4.5 and 6.5.

4. A pharmaceutical preparation comprising a dry mixture of 3-amino-4-hydroxy phenyl dichloroarsine hydrochloride and a greater than equivalent proportion of sodium citrate, said mixture when dissolved in water having a pH value between 4.5 and 6.5.

5. A pharmaceutical preparation comprising a dry mixture of 3-amino-4-hydroxy phenyl arsine oxide hydrochloride and a greater than equivalent proportion of sodium citrate, said mixture when dissolved in water having a pH value between 4.5 and 6.5.

RUSSELL HOPKINSON.
ALEXANDER V. TOLSTOOUHOV.